June 26, 1934.  L. O. BIRD  1,964,617
MATERIAL MOVING IMPLEMENT
Filed Dec. 27, 1932  2 Sheets-Sheet 1
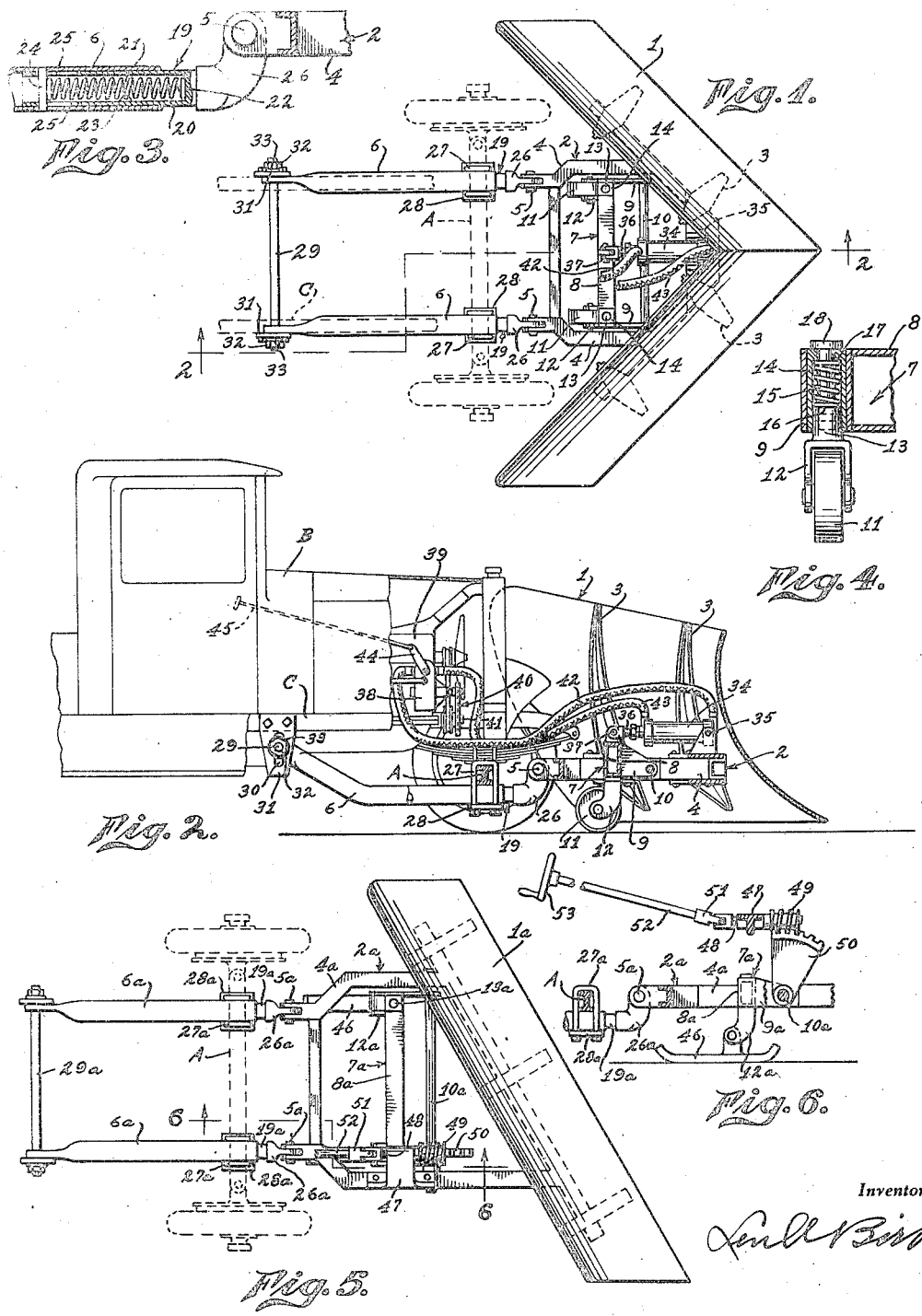

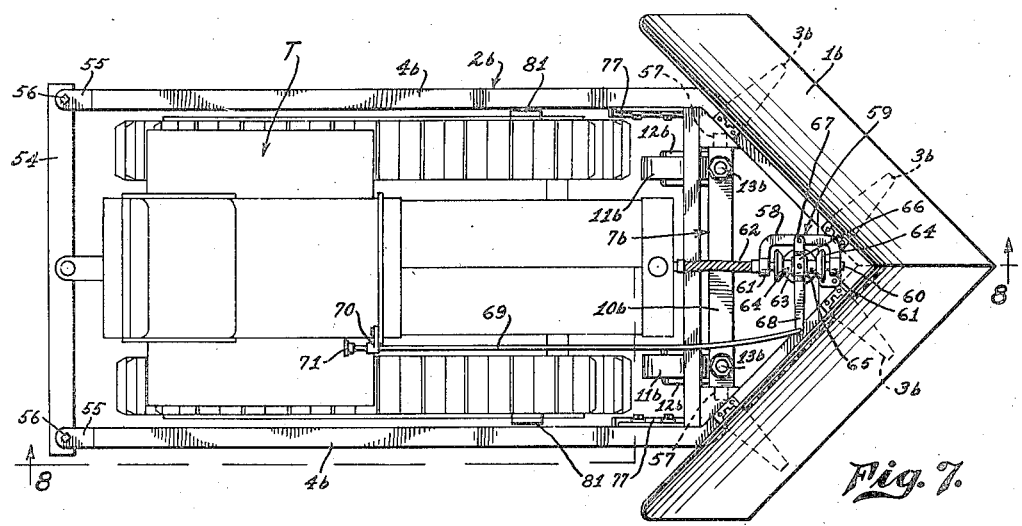
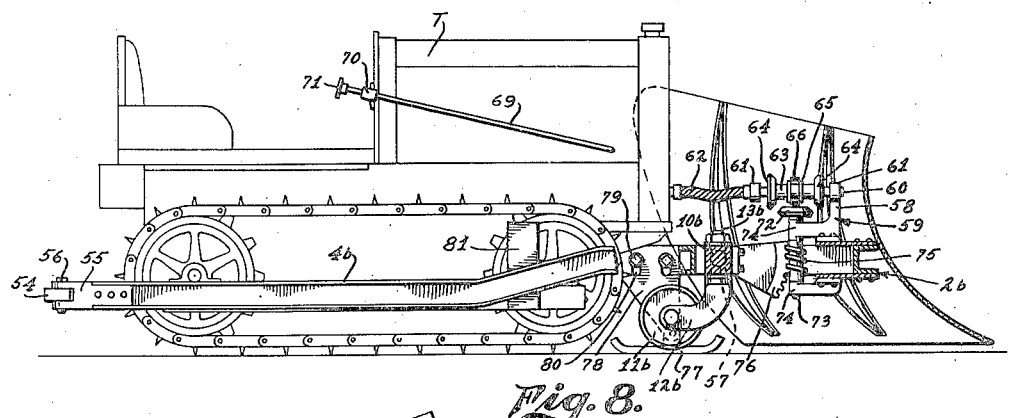
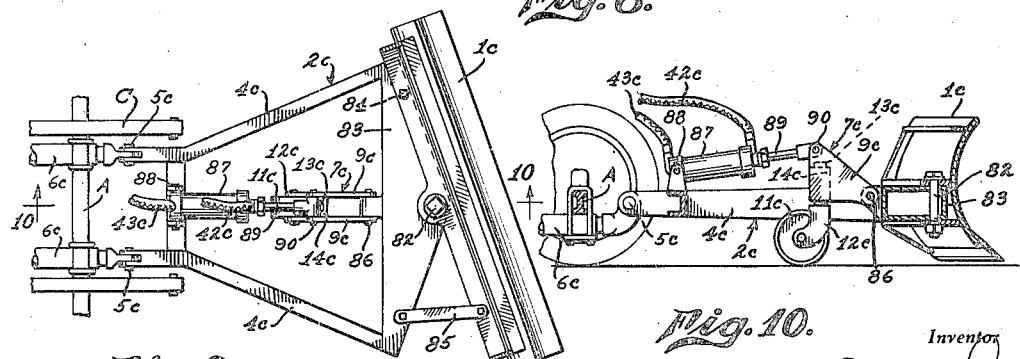

Patented June 26, 1934

1,964,617

UNITED STATES PATENT OFFICE 1,964,617

MATERIAL MOVING IMPLEMENT

Len O. Bird, Glendale, Calif.

Application December 27, 1932, Serial No. 648,898

5 Claims. (Cl. 37—42)

This invention relates to material moving implements of the type adapted to be propelled by motor vehicles and has for its particular object the provision of an implement in which the entire weight of same is supported on its own rolling means, thus leaving the motor vehicle entirely free of the weight, especially at the front end where implements of this type are usually supported and which is not designed to carry heavy loads.

Another object is the provision of an implement which is pivotally secured at its rear end to a motor vehicle and is supported on a wheeled frame at a point intermediate the ends and on the center of gravity of the implement to balance its weight, so that when the wheeled frame is actuated to swing the implement up or down about the pivot point on the vehicle for raising or lowering the implement, the whole structure oscillates on the balancing point, thus leaving the motor vehicle free of any loads and preventing torsional, bending and other deforming strains on any part thereof, consequently, increasing greatly the efficiency of the vehicle.

It also has for its object the provision of an implement in which the thrust members are rigidly secured to the front axle of a motor vehicle and are also adapted to slide vertically in their mountings on the vehicle frame, thus the axle insures parallel travel of the blade or earth working tools with respect to the ground surface, the mounting on the frame permits the vehicle to push the implement at that point without strain on the front axle, and the slidable connections in the frame mountings prevent the swaying or bouncing of the vehicle body or frame from disturbing the parallel travel of the blade or tools.

Another object is the provision of an implement in which the thrust members are connected to the vehicle through resilient means for absorbing the shock of the impact upon striking an obstruction with the blade or tools.

A further object is the provision of an implement in which the bell crank frame carries caster wheels or caster runners for turning the implement around corners or curves with a minimum power loss.

Another object is the provision of an implement in which the rolling means may be swung out from under the implement to permit the weight of same to assist the blade or other tools in digging into hard packed material which usually has a tendency to gradually raise the blade or tools.

As another object it provides an implement which may be used for a variety of purposes such as, snow removing, scraping, leveling, cultivating, plowing, ripping, scarifying, etc., by simply providing a suitable frame structure in each instance for mounting the various blades and earth working tools.

As a still further object, it provides a simple and compact yet substantial power controlled implement in which the blade or other tools may be raised or lowered for transporting the implement from place to place, clearing obstructions and controlling the degree of operation quickly and efficiently with a minimum of power and with practically no strain on the vehicle or any part thereof.

With these and other objects in view the invention consists in the combination, correlation and construction of parts, members and features which will be described in the specification and will be finally pointed out in the claims.

Referring to the drawings:

Figure 1 is a plan view of a device embodying my invention.

Figure 2 is is a section on line 2—2 of Figure 1.

Figure 3 is a sectional view illustrating the shock absorbing means.

Figure 4 is a sectional view showing mounting of the caster wheels.

Fig. 5 is a plan view of a modified form of the device.

Figure 6 is a section on line 6—6 of Figure 5.

Figure 7 is a plan view illustrating another modified form of the device.

Figure 8 is a section on line 8—8 of Figure 7.

Figure 9 is a plan view of another modification.

Figure 10 is a section on line 10—10 of Figure 9.

Referring to Figures 1 to 4 inclusive:

The V type blade 1 is secured on frame 2 by means of brackets 3. The side members 4 of frame 2 are pivotally connected as at 5 to thrust members 6. Located between the side members 4 is a wheeled frame 7 comprising a cross member 8 having at its ends forwardly extending plates 9 fixed to a transverse shaft 10 which in turn is journaled at its ends in frame 2. Caster wheels 11 are journaled in yokes 12 on the spindles 13 which in turn are journalled in bearings 14 located in the ends of cross member 8. A spring 15 interposed between the shoulder 16 on the spindle 13 and a shoulder 17 in bearing 14 offers a resilient mounting for the caster wheels 11 to absorb shocks resulting from going over rough surfaces. A retaining collar 18 is located at the top of spindle 13. The transverse shaft is located at the center of gravity of the implement to support and balance the weight of same on the wheeled frame 7.

The thrust members 6 are of tubular section open at the front end to receive shock absorbers 19 each consisting of a tubular plunger 20 housing a spring 21 which is under compression between the end 22 of blind hole 23 and a pin 24. The pin 24 goes through both the thrust member 6 and the plunger 20. A slot 25 permits the plunger 20 to move against spring 21 to dampen the shock of impact upon striking an obstruction with the blade 1. The plungers 20 carry at the forward ends the heads 26 adapted to connect pivotally to the ends of side members 4 as shown at 5.

The thrust members 6 are secured near their forward ends to axle A of the motor vehicle B by means of U bolts 27 and plates 28. The rear ends of thrust members 6 are flattened and carry a spacing rod 29 which projects at the ends through slots 30 in the thrust plates 31 which in turn are secured on the frame C of the vehicle B. Nuts 32 on the ends of spacing rod 29 maintain a fixed clearance between washers 33 and the flattened ends of thrust members 6 so that the ends of spacing rod 29 may float in the slots 30.

The thrust members 6 are secured rigidly to the front axle A of the motor vehicle to keep the pivot point 5 in a relatively fixed vertical position so that the blade 1 will travel parallel to the ground surface. The floating connection at the thrust plates 31 on the frame C permits the pushing of the implement through the thrust members without strain on the axle A and prevents the swaying and bouncing of the frame A from disturbing the parallel relation of the blade 1 with respect to the ground surface.

A hydraulic power unit 34 pivotally mounted on frame 2 at 35 actuates wheeled frame 7 through the piston rod 36 pivotally connected at 37 to the cross member 8. A pump 38 mounted on the engine 39 of the motor vehicle is driven by chain assembly 40 from crank shaft 41 and supplies fluid under pressure to the hydraulic power unit through hose conduits 42 and 43. A system of valves for control of the fluid is located within the pump housing (conventional therefore not illustrated in detail) is operated through lever 44 and push rod 45 from the driver's compartment.

In this modification all parts similar to those in the preferred form have the same identifying numerals with the letter $a$ added.

Referring to Figures 5 to 6 inclusive:

The frame 2a carries the blade 1a and has pivotally secured thereon at the center of gravity of the unit a transverse shaft 10a which in turn has the frame 7a fixed thereon. Shoes or runners 46 are pivotally secured in caster yokes 12a at the ends of frame 7a. Bracket 47 fixed on one of the side members 4a carries a shaft 48 which has on its forward end a worm 49 engaging a worm segment 50 fixed to transverse shaft 10a. The rear end of shaft 48 is connected through a universal joint 51 to a rod 52 and hand wheel 53 which is located within reach of the truck driver. By turning hand wheel 53 the runner frame 7a is actuated to raise or lower the blade 1a.

Referring to Figures 7 and 8 inclusive:

The V type blade 1b is secured on frame 2b by means of brackets 3b. The side members 4b of the frame 2b extend rearwardly along the sides of tractor T and connect to draw bar 54 by means of clevis members 55 and bolts 56. Clevis members 55 fit loosely on draw bar 54 to permit pivoting of side members 4b at this point when the blade 1b is raised or lowered.

A cross member 10b is pivoted at the center of gravity of the unit in the frame 2b as shown at 57 and has pivotally disposed near the ends thereof the spindles 13b on yokes 12b of the caster wheels 11b.

Centrally located on frame 2b and secured thereon by means of bracket 58 is a reversing mechanism 59 in which the shaft 60 located in bearings 61 is driven by the crank shaft of the engine in tractor T through the flexible shaft 62. A sleeve 63 keyed to shaft 60 and adapted to slide thereon carries at its ends the cones 64 and centrally disposed thereon a collar 65 in operative engagement with yoke 66 which in turn is pivoted on brackets 58 as at 67. A lever 68 projecting from yoke 66 connects to a push rod 69 which slides in bracket 70 on the dash board of the tractor and has at its ends a suitable knob or handle 71. Thus by pushing or pulling the rod 69 the cones 64 selectively engage a cone 72 secured to a vertical shaft 73 which is mounted in bearings 74 and has secured thereon a worm 75 engaging the worm segment 76 secured to cross member 10b, thereby actuating the cross member 10b and the caster wheels 11b for raising or lowering the blade 1b.

When encountering conditions on the ground surface which will not permit the use of caster wheels, the weight of the implement may be carried on shoes or runners 77 by simply lowering the implement until it rests on the runners 77 then continuing the rotation of the cross member 10b to raise the caster wheels 11b above the ground surface as illustrated in Figure 8. The shoes or runners 77 are pivotally secured to plates 78 which in turn are adjustably mounted on the side members 4b by means of bolts 79 through slots 80 in plates 78.

Rub plates 81 mounted on the caterpillar frames in the usual manner keep the side members 4b from interfering with the caterpillars when turning a corner or going around a curve.

Referring to Figures 9 and 10 inclusive:

The blade 1c is of the reversible type in which the angle may be changed to deposit the removed material on either side of the vehicle by swinging it about the pivot point 82 on the cross head 83 of the frame 2c and securing it in place by means of the bolt 84 and link 85 to cross head 83.

The wheeled frame 7c includes the bearing 14c interposed between forwardly extending plates 9c and carrying the spindle 13c of the yoke 12c and caster wheel 11c. The forward ends of plates 9c are pivotally secured at the center of gravity of the implement to cross head 83 as shown at 86.

A hydraulic power unit 87 journaled in bracket 88 mounted on frame 2c has its piston rod 89 pivotally connected at 90 to wheeled frame 7c for actuating same to raise or lower the blade 1c.

Fluid under pressure is supplied to the hydraulic power unit from a pump mounted on and driven by the engine of the motor vehicle, as shown in Figure 2, through the hose conduits 42c and 43c.

While I have illustrated and described an implement embodying my invention as adapted for removal of snow and leveling ground surfaces I do not wish to be limited thereto as changes might be made in the frame structure for mounting ground working tools as used in plowing, ripping, scarifying, cultivating, etc., without departing from the spirit of the invention as defined in the appended claims.

Having thus described my invention I claim:

1. An implement comprising a frame structure having rearwardly extending side members thrust members securely fixed to front axle of a motor vehicle and pivotally connected to said side members, thrust plates secured to the frame of said vehicle and having vertical sliding connection with said thrust members, a transverse shaft journaled in said frame structure, a frame carrying caster wheels secured to said shaft, means for actuating said frame and caster wheels for raising and lowering said implement.

2. An implement as described in claim 1 in which the thrust members are of tubular cross section and have shock absorbing means therein adapted for pivotal connection to side members of the frame structure.

3. An implement as described in claim 1 in which the frame fixed on the transverse shaft has the caster wheels mounted resiliently therein on shock absorbing means.

4. An implement comprising a frame structure having rearwardly extending side members, material moving tools mounted on said frame structure, thrust members securely fixed to front axle of a motor vehicle, horizontally yielding means at the forward ends of said thrust members adapted for pivotal connection to said side members, thrust plates secured to the frame of said vehicle and having vertically sliding connection with the rear ends of said thrust members, a rolling support for said frame structure, means for actuating said rolling support to raise and lower said implement.

5. An implement comprising a fabricated frame structure having rearwardly extending side members, material moving tools mounted on said frame structure, tubular thrust members securely fixed to front axle of a motor vehicle, horizontally yielding means within the forward ends of said tubular thrust members adapted for pivotal connection to said side members, thrust plates secured to the frame of said vehicle and having vertically sliding connection with the rear ends of said thrust members, a rolling support for said frame structure and means for actuating said rolling support for oscillating said frame structure about said pivotal connection to raise and lower said material moving tools.

LEN O. BIRD.